United States Patent
Sakata

(10) Patent No.: US 9,878,668 B2
(45) Date of Patent: Jan. 30, 2018

(54) VEHICLE OUTSIDE MIRROR DEVICE

(75) Inventor: Ikuo Sakata, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 92 days.

(21) Appl. No.: 13/302,412

(22) Filed: Nov. 22, 2011

(65) Prior Publication Data

US 2012/0134035 A1 May 31, 2012

(30) Foreign Application Priority Data

Nov. 26, 2010 (JP) ................. 2010-264174

(51) Int. Cl.
*B60R 1/074* (2006.01)
*B60R 1/07* (2006.01)

(52) U.S. Cl.
CPC ............... *B60R 1/074* (2013.01); *B60R 1/07* (2013.01)

(58) Field of Classification Search
CPC ......... B60R 1/072; B60R 1/074; B60R 1/076; B60R 1/02; B60R 1/025; B60R 1/06; B60R 1/0617; B60R 1/062; B60R 1/07; B60R 1/08; B60R 1/081; B60R 1/082; B60R 1/083; B60R 1/086; B60R 1/087
USPC ........ 359/841, 871, 872, 873, 875, 877, 878
See application file for complete search history.

(56) References Cited

U.S. PATENT DOCUMENTS

| | | | |
|---|---|---|---|
| 4,982,926 A * | 1/1991 | Mori et al. ................. | 248/479 |
| 6,022,113 A | 2/2000 | Stolpe et al. | |
| 6,053,060 A | 4/2000 | Tumberlinson et al. | |
| 2002/0105740 A1 | 8/2002 | Yamauchi | |
| 2006/0213744 A1 * | 9/2006 | Kornsteiner et al. ........ | 192/56.6 |
| 2007/0285812 A1 * | 12/2007 | Foote et al. .................. | 359/877 |
| 2008/0149803 A1 | 6/2008 | Yoshida et al. | |
| 2008/0259474 A1 * | 10/2008 | Onuki .......................... | 359/841 |
| 2008/0297927 A1 * | 12/2008 | Onuki .......................... | 359/841 |
| 2009/0040639 A1 * | 2/2009 | Onuki .......................... | 359/877 |
| 2010/0238570 A1 * | 9/2010 | Reedman et al. ........... | 359/841 |
| 2011/0235200 A1 | 9/2011 | Sakata | |

FOREIGN PATENT DOCUMENTS

| | | |
|---|---|---|
| CN | 1333864 A | 1/2002 |
| CN | 101209696 A | 7/2008 |
| DE | 198 33 514 A1 | 3/1999 |
| DE | 10009579 B4 | 2/2006 |
| JP | 2001-287593 A | 10/2001 |
| JP | 2011-201447 A | 10/2011 |
| WO | WO 2007/128445 A2 | 11/2007 |

* cited by examiner

Primary Examiner — Marin Pichler
(74) Attorney, Agent, or Firm — Foley & Lardner LLP

(57) ABSTRACT

It is important to eliminate or reduce dispersion in clutch torque of a clutch mechanism for each product to its required minimum. According to the present invention, a clutch member 25 that is manufactured separately from a gear member 33 of a clutch gear 32 is formed of a resin member. As a result, there is no need to apply a treatment of eliminating surface roughness or a surface hardening treatment in the clutch member 25, and therefore, no dispersion occurs in surface roughness or surface hardening of a clutch protrusive portion 40 of the clutch member 25 that is made of a resin member, and the dispersion in clutch torque can be eliminated or can be reduced to its required minimum.

6 Claims, 10 Drawing Sheets

VEHICLE OUTSIDE MIRROR DEVICE

CROSS REFERENCE TO RELATED APPLICATIONS

This application claims priority of Japanese Patent Application No. 2010-264174 filed on Nov. 26, 2010. The contents of this application are incorporated herein by reference in their entirety.

BACKGROUND OF THE INVENTION

1. Field of the Invention

The present invention relates to a vehicle outside mirror device enabling a mirror assembly to be mounted to enable rotation (tilting or turning) on a vehicle body via an electrically driven storage unit and a base. In other words, the present invention relates to a vehicle outside mirror device such as an electrically storage type door mirror, for example.

2. Description of the Related Art

A vehicle outside mirror device of such type is conventionally known (for example, Japanese Unexamined Patent Application Publication No. 2001-287593). Hereinafter, a conventional vehicle outside mirror device will be described. The conventional vehicle outside mirror device enables a clutch mechanism to be configured with a gear to be inserted through a shaft and a plate clutch. In the conventional vehicle outside mirror device, at the time of normal use, a protrusive portion of the gear and a recessed portion of the plate clutch engage with each other, the gear is unable to rotate around the shaft, and if a motor is driven in this state, a mirror body rotates around the shaft. In addition, if an external force is applied to the mirror body while the motor is established in an inactive state, the protrusive portion of the gear and the recessed portion of the plate clutch disengage from each other and then the gear is able to rotate around the shaft. The mirror body then rotates around the shaft, releasing the external force.

In such a vehicle outside mirror device, it is important to eliminate or reduce dispersion in clutch torque of the clutch mechanism (resource torque of the clutch mechanism) for each product to its required minimum.

The present invention has been made in order to solve the above-described problem that it is important to eliminate or reduce dispersion in clutch torque of a clutch mechanism for each product to its required minimum.

SUMMARY OF THE INVENTION

A vehicle outside mirror device according to present invention of which a mirror assembly is rotatably mounted on a vehicle body via an electrically driven storage unit and a base, the electrically driven storage unit comprising:
a shaft holder that is fixed to the base;
a shaft that is provided on the shaft holder;
a casing which is rotatably mounted on the shaft, and on which the mirror assembly is mounted;
a motor and a rotation force transmission mechanism which are housed in the casing, for electrically driving the mirror assembly to rotate relative to the shaft; and
a clutch mechanism which is provided in the rotation force transmission mechanism, which is unable to be disengaged with an electrically driven rotation force of the motor and the rotation force transmission mechanism, and is able to be disengaged with a force that is equal to or greater than the electrically driven rotation force to thereby enable the mirror assembly to rotate relative to the shaft, the clutch mechanism comprising:
a clutch gear having a clutch portion;
a clutch holder having a clutch portion; and
a spring configured to connect the clutch portion of the clutch gear and the clutch portion of the clutch holder to each other so as to enable disconnection from each other, wherein the clutch gear is made of a clutch member having the clutch portion and a gear member having a gear portion, the clutch member and the gear member are fixedly mounted in a rotational direction, and the clutch member is formed of a resin member.

The vehicle outside mirror device according to the present invention, wherein the gear member is formed of a metal member or a resin member with high rigidity.

The vehicle outside mirror device according to the present invention, wherein the clutch holder is formed of a resin member.

The vehicle outside mirror device according to the present invention, wherein the gear member is formed in a cylindrical shape, the gear portion being provided on an outer circumferential face of the gear member, the clutch member is formed in a cylindrical shape, the clutch portion being provided on one end face of the clutch member, a rotation stop portion configured to prevent mutual rotation around a rotational center of the shaft and a movement stop portion configured to prevent mutual movement in a direction of a rotational centerline of the shaft are respectively provided on the clutch member and the gear member, the clutch member is inserted into the gear member to disable rotation around the rotational center of the shaft by means of the rotation stop portion and to disable movement in the direction of the rotation centerline of the shaft by means of the movement stop portion, and the clutch member and the gear member are integrally mounted.

According to a vehicle outside mirror device of a first aspect of the present invention, a clutch member having a clutch portion and a gear member having a gear portion are manufactured respectively separately and then the clutch member and the gear member are fixedly mounted in a rotational direction to thereby form a clutch gear of a clutch mechanism, and the clutch member that is manufactured separately from the gear member of the clutch gear is formed of a resin member. As a result, the vehicle outside mirror device of the first aspect of the present invention is capable of eliminating or reducing dispersion in clutch torque of the clutch mechanism for each product to its required minimum, in comparison with a clutch gear in which a clutch portion and a gear portion are integrally formed and which is formed of a metal member or a resin member with its high rigidity. In other words, in a case where a clutch gear is made of a metal member, there is a need to apply a treatment of eliminating surface roughness such as barrel grinding in order to stabilize a clutch torque, or alternatively, there is a need to apply a surface hardening treatment such as a heat treatment in order to improve frictional properties. Due to dispersion in these treatments, dispersion occurs in surface roughness or surface hardening of the clutch portion, leading to dispersion in clutch torque. In contrast, according to the vehicle outside mirror device of the first aspect of the present invention, a gear member of a clutch gear and a clutch member that is manufactured separately are formed of a resin member, and therefore, there is no need to apply a treatment of eliminating surface roughness in a clutch gear or a surface hardening treatment. As a result, no dispersion occurs in surface roughness or surface hardening of a clutch portion of the clutch member that is made of the resin member, and the dispersion in clutch torque can be eliminated or can be reduced to its required minimum.

Moreover, according to the vehicle outside mirror device of the first aspect of the present invention, there is no need to apply a treatment of eliminating surface roughness or a surface hardening treatment in clutch member of a clutch gear, and therefore, manufacturing costs can be reduced accordingly.

In addition, according to a vehicle outside mirror device of a second aspect of the present invention, a gear member that is manufactured separately from a clutch member of a clutch gear is formed of a metal member or a resin member with its high rigidity, and therefore, even if the clutch member that is manufactured separately from the gear member is made of the resin member, the rigidity or durability of a gear portion of the clutch gear can be ensured in the same manner as that in the clutch gear made of the metal member or the resin member with its high rigidity.

Further, according to a vehicle outside mirror device of a third aspect of the present invention, a clutch holder is formed of a resin member, and therefore, a stable clutch torque can be ensured over a long period of time from an initial stage of manufacture by using a combination of: a clutch portion of the clutch holder that is made of the resin member; and a clutch portion of a clutch member that is made of a same resin member, of a clutch gear, in other words, by using a combination of the clutch portions that are made of a resin member with its low friction and high sliding properties.

Moreover, according to the vehicle outside mirror device of the third aspect of the present invention, dependency on grease can be reduced in comparison with a combination of the clutch portions that are made of a metal member or a resin member with its high rigidity, by using a combination of the clutch portions that are made of a resin member with its low friction and high sliding properties, and even in a case where the quantity of grease is reduced, an increase in clutch torque can be restrained and then a stable clutch torque can be obtained accordingly.

Furthermore, according to a vehicle outside mirror device of a fourth aspect of the present invention, by means for solving the problem described previously, even if a clutch gear is formed of a clutch member and a gear member that are manufactured separately, a clutch portion and a gear portion is capable of acting as a clutch in the same manner as that in a clutch gear which is fixed in a rotational direction.

DESCRIPTION OF THE PREFERRED EMBODIMENTS

Hereinafter, an exemplary embodiment of a vehicle outside mirror device according to the present invention will be described with reference to the drawings. It should be noted that these exemplary embodiments do not limit the present invention.

Exemplary Embodiment (Description of Configuration)

Figure 1:
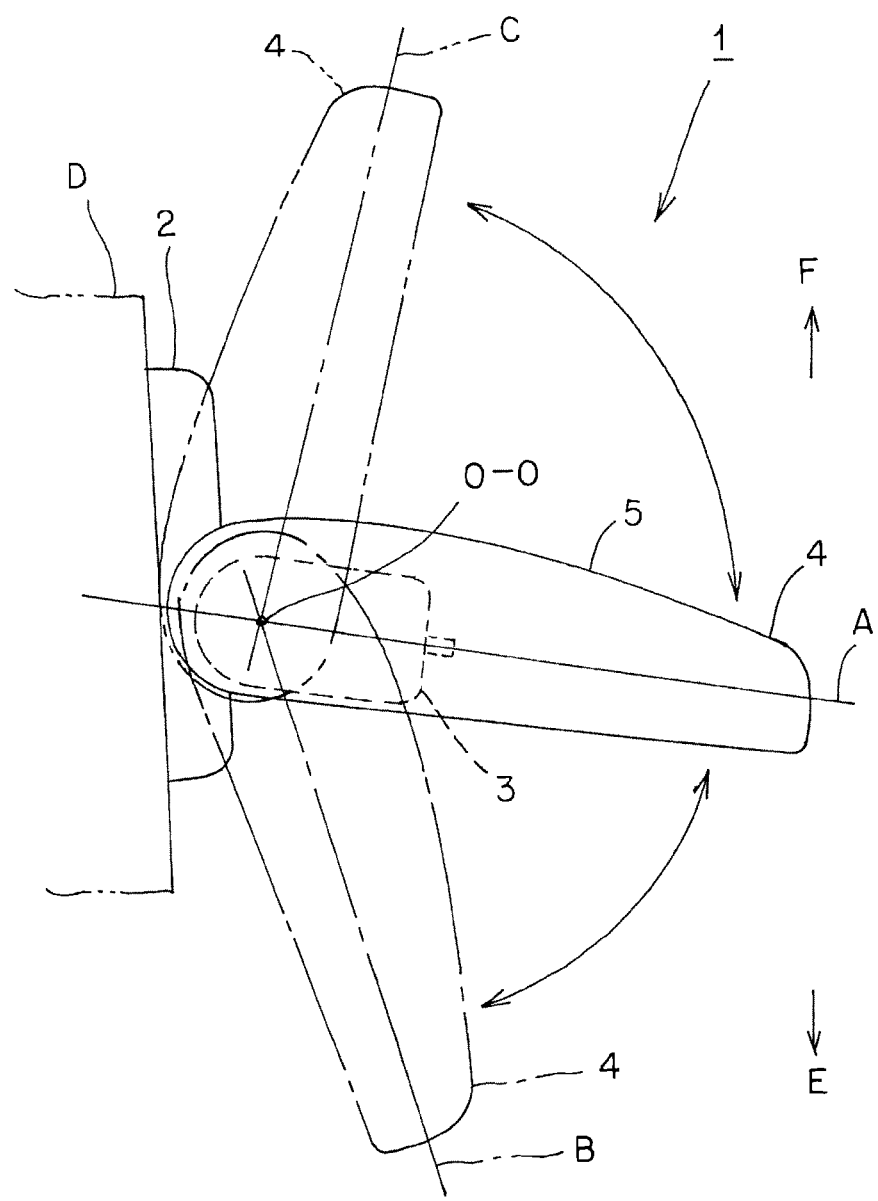
FIG. 1 is a plan view of a use state showing an exemplary embodiment of a vehicle outside mirror device according to the present invention.

Hereinafter, a configuration of the vehicle outside mirror device in the exemplary embodiment will be described. In FIG. 1, reference numeral 1 designates the vehicle outside mirror device in the exemplary embodiment. In this example, an electrically storage type door mirror device (an electrically driven storage type door mirror) is provided. The electrically driven storage type door mirror 1 is equipped at a respective one of the left and right doors of an automobile. The electrically driven storage type door mirror 1 of the exemplary embodiment is equipped at the right side door of the automobile, and an electrically driven storage type door mirror device equipped at the left side door of the automobile is reversed at the left and right from the electrically driven storage type door mirror device 1 of the exemplary embodiment.

In the electrically driven storage type door mirror device 1, as shown in FIG. 1, a mirror assembly 4 is the one that is rotatably mounted on a vehicle body (an automobile door) D via an electrically driven storage unit 3 and a base (a mirror base) 2. The base 2 is the one that is fixed to the door D.

Figure 4:
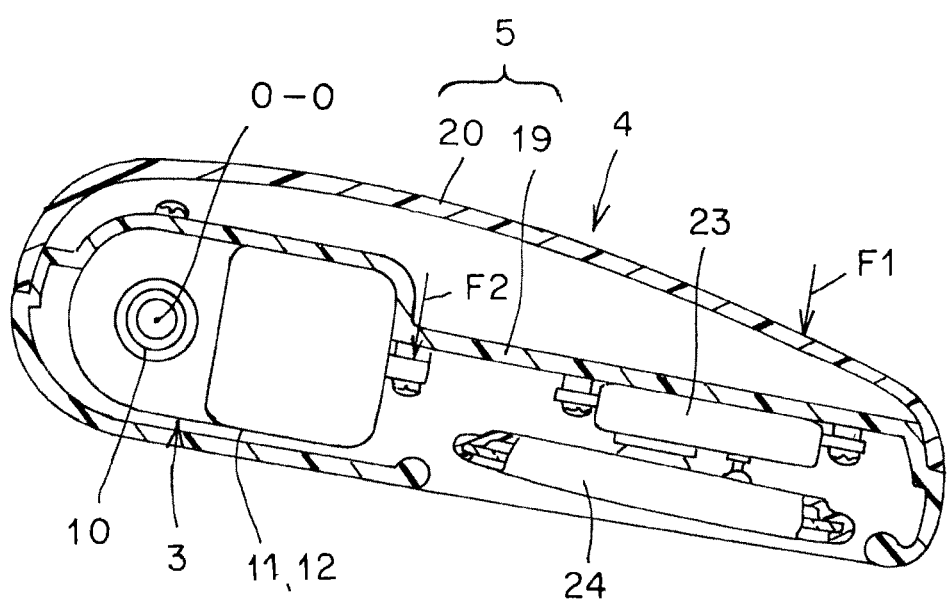
FIG. 4 is a transverse sectional view (a horizontal sectional view) showing an inside of a mirror assembly, similarly.
Figure 5:
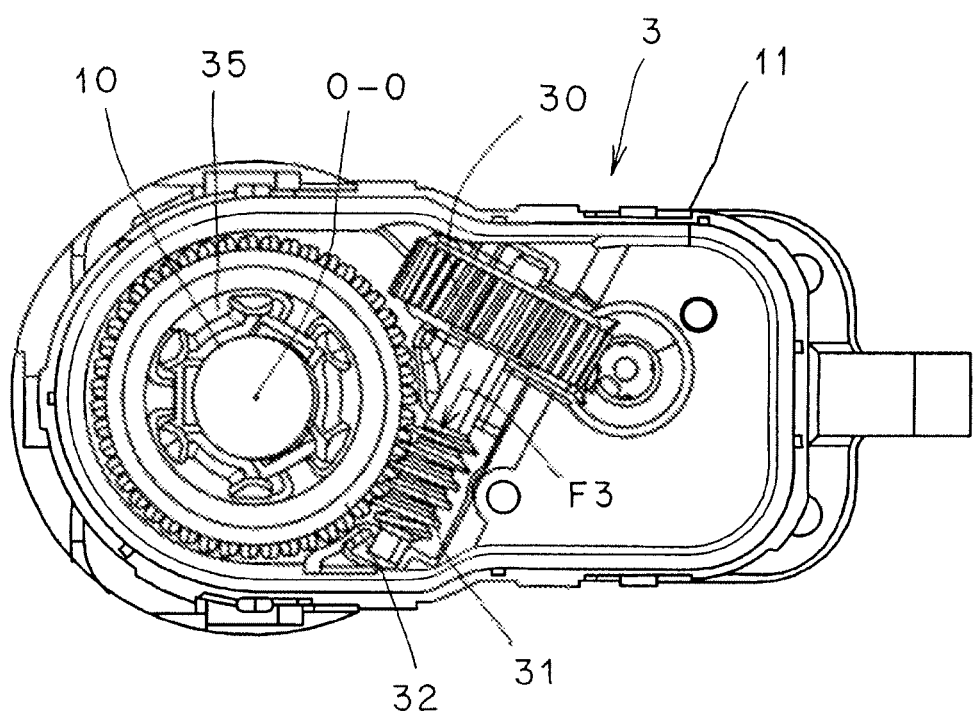
FIG. 5 is a transverse sectional view (a horizontal sectional view) showing an inside of the electrically driven storage unit, similarly.

The aforementioned mirror assembly 4, as shown in FIG. 1 and FIG. 4, is formed of: a mirror housing 5 that is made of a main body portion (mount bracket) 19 and a cover portion 20; a power unit 23 that is mounted on the main body portion 19; and a mirror unit 24 that is mounted on the power unit 23 to enable tilting in a vertical direction and in a horizontal direction.

The electrically driven storage unit 3 is provided with: as shown in FIGS. 2 to 5, a shaft holder 9; a shaft 10; a gear case 11 and a cover 12, a respective one of which serves as a casing; a motor 13; a deceleration mechanism 14 and a clutch mechanism 15, each of which serves as a rotation force transmission mechanism; a bearing member 16; an interposing member 6; an electrically driven rotation range restricting mechanism (See Japanese Patent Application No. 2010-071463) and a buffering mechanism (See Japanese Patent Application No. 2010-071463).

The shaft holder 9 is fixed to the base 2. The shaft 10 is integrally provided at a center of one face (a top face) of the shaft holder 9. The shaft 10 is formed in a hollow shape, and is configured so that a harness (not shown) is inserted through the shaft. On the shaft 10, the gear case 11 and the cover 12 are rotatably mounted around a rotational center O-O of the shaft 10. The mount bracket of the mirror assembly 4 is mounted on the gear case 11. In the gear case 11 and the cover 12, there are housed: the motor 13; the deceleration mechanism 14 and the clutch mechanism 15, a respective one of which serves as the rotation force transmission mechanism; the bearing member 16; the interposing member 6; the electrically driven rotation range restricting mechanism, and the buffering mechanism, respectively.

The gear case 11, as shown in FIGS. 2 to 5, is formed in a sectional recessed shape of which one side (a lower side) is closed and the other side (an upper side) is opened. In other words, in the gear case 11, there is provided a housing portion 18 formed in a sectional recessed shape of which the shaft holder 9 side is closed and the cove 12 side is opened. An insert hold (not shown) 19 is provided at a closed portion of the gear case 11. The shaft 10 is inserted into the insert hole. As a result, the gear case 11 is rotatably mounted on the shaft 10 so as to be rotatable around the rotational center O-O of the shaft 10.

Figure 2:
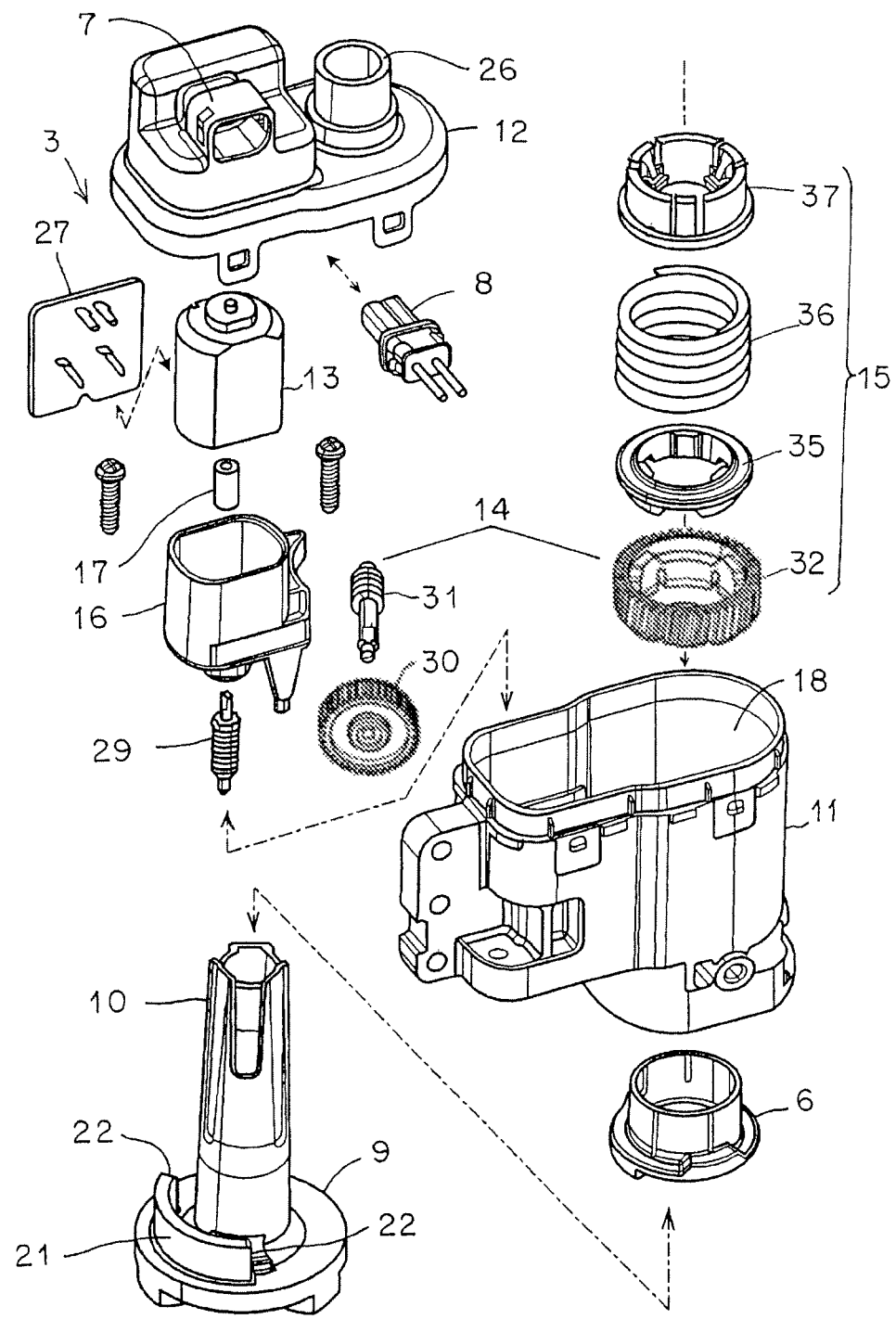
FIG. 2 is an exploded perspective view showing an electrically driven storage unit, similarly.
Figure 3:
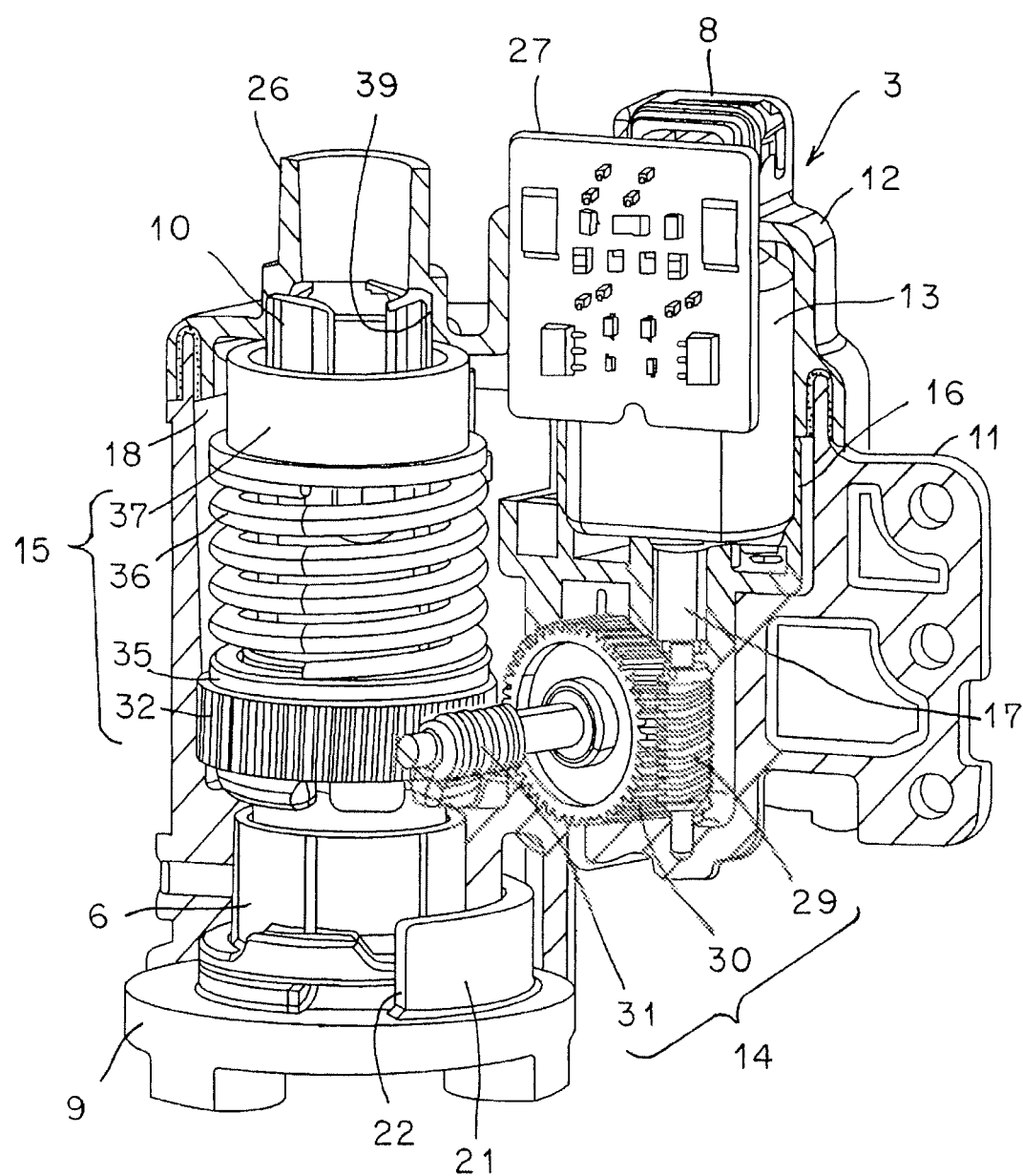
FIG. 3 is a perspective view showing an electrically driven storage unit, although a casing is not partially shown, similarly.

As shown in FIG. 2 and FIG. 3, an arc shaped stopper protrusive portion 21 around the rotational center O-O of the shaft 10 is integrally provided on a top face of the shaft holder 9. Stopper faces 22 are provided on both end faces of the stopper protrusive portion 21, respectively. On the other hand, an arc shaped guide groove (not shown) around the rotational center O-O of the shaft 10 is provided on a bottom face of the gear case 11. Stopper faces are provided on both end faces of the guide groove, respectively.

The stopper protrusive portion 21 of the shaft holder 9 is engaged with the guide groove of the gear case 11. The stopper protrusive portion 21 and the guide groove configure a guide member serve as a guide when the gear case 11 rotates around the rotational center O-O of the shaft 10 relative to the shaft holder 9, in other words, as shown in FIG. 1, when the mirror assembly 4 rotates between a use location A and a storage location B relative to the base 2 and between the use location A and a forward tilting location C backward (in the clockwise direction seen from the top) or forward (in the counterclockwise direction seen from the top). In FIG. 1, reference numeral E designates a backside of a vehicle and reference numeral F designates a foreside of the vehicle.

In addition, the stopper face 22 of the stopper protrusive portion 21 and the stopper face of the guide groove configures a stopper member in which, before the mirror assembly 4 rotates and abuts against the door D in the clockwise direction seen from the top or in the counterclockwise direction seen from the top, the stopper face 22 of the stopper protrusive portion 21 and the stopper face of the guide groove abut against each other and then rotation of the mirror assembly 4 is restricted, the stopper member serving as a stopper for avoiding abutment of the mirror assembly 4 against the door D.

The cover 12, as shown in FIG. 2 and FIG. 3, is formed in a sectional inverted recessed shape of which one side (an upper side) is closed and the other side (a lower side) is opened. In other word, on the cover 12, there is provided a housing portion 18 formed in a sectional inverted recessed shape of which one side, i.e., the gear case 11 side is opened and the other side is opened. On the cover 12, a harness insert cylinder portion 26 which communicates with the shaft 10 formed in a hollow shape is integrally provided.

In addition, a socket portion 7 is provided at the cover 12. On the socket portion 7, a connector 8 which is electrically connected to a power supply (a battery) side, although not shown, electrically intermittently connects thereto and is mounted in a mechanically detachable manner. A board 27 is mounted on the socket portion 7. The board 27 is electrically connected to the motor 13. A switch circuit for controlling the drive or stoppage of the motor 13 is packaged on the board 27. As a result, the motor 13 is electrically connected to the connector 8 via the board 27 and the socket portion 7.

The cover 12 is engagingly fixed to the outside of an opening rim of the housing portion 18 of the gear case 11. In the housing portion 18 inside the gear case 11 and the cover 12, the motor 3, the deceleration mechanism 14, the clutch mechanism 15, the bearing member 16, the interposing member 6, the electrically driven rotation range restricting mechanism, the buffering mechanism, and the board 27 are fixedly housed by means of screws or the like.

In addition, on the cover 12, an insert hole 39 is provided so as to communicate with the harness insert cylinder portion 26. The shaft 10 is inserted into the insert hole 39. As a result, the cover 12 is mounted on the shaft 10, together with the gear case 11, so as to be rotatable around the rotational center O-O of the shaft 10.

The deceleration mechanism 14 and the clutch mechanism 15, a respective one of which serves as the rotation force transmission mechanism, as shown in FIG. 2 and FIG. 3, are the ones that are housed in the housing portion 18 of the gear case 11 and the cover 12, that are provided between an output shaft (not shown) and the shaft 10, of the motor 13, and that transmit a rotation force of the motor 13 to the shaft 10. The motor 13, the deceleration mechanism 14, and the clutch mechanism 15, a respective one of which serves as the rotation force transmission mechanism, are the ones that are electrically driven relative to the shaft 10 to rotate the mirror assembly 4 around the rotational center O-O of the shaft 10.

The deceleration mechanism 14 is comprised of: a first worm gear 29 which serves as a first step gear; a helical gear 30 which serves as a second step gear engaging with the first worm gear 29; a second worm gear 31 which serves as a third step gear; and a clutch gear 32 which serves as a final step gear with which the second worm gear 31 engages.

The first worm gear 29 is rotatably borne on the gear case 11 and the bearing member 16. The first worm gear 29 is linked with an output shaft of the motor 13 via a joint 17.

The helical gear 30 is rotatably borne on the bearing member 16. The second worm gear 31 is rotatably borne on the gear case 11 and the bearing member 16. As a result, the helical gear 30 is integrally coupled to the aforementioned second worm gear 31. The second worm gear 31 is rotatably borne on the gear case 11 and the bearing member 16 via the second worm gear 31. The helical gear 30 and the second worm gear 31 are linked with each other integrally rotatably.

The clutch mechanism 15 is provided with the clutch gear 32, a clutch holder 35, a spring 36, and a push nut 37. The clutch mechanism 15 is configured by sequentially engaging the clutch gear 32, the clutch holder 35, and the spring 36 with the shaft 10, locking the push nut 37 with the shaft 10, and then, establishing the spring 36 in a compressed state. The clutch gear 32 and the clutch holder 35 are linked with each other in a intermittently connectable manner. The second worm gear 31 of the deceleration member 14 and the clutch gear 32 of the clutch mechanism 15 engage with each other, whereby a rotation force of the motor 13 is transmitted to the shaft 10.

The clutch gear 32 and the clutch holder 35 configure the clutch mechanism 15. The clutch gear 32 is mounted on the shaft 10 so as to be rotatable around the rotational center O-O of the shaft 10 and to be movable in an axial direction. The clutch holder 35 is mounted on the shaft 10 in an engaged state so as to disable rotation and to be movable in an axial direction.

As shown in FIGS. 11 to 16, a plurality of, i.e., three mountain-shaped clutch protrusive portions 49 and three valley-shaped clutch portions 41 are provided at equal intervals on a face which is mutually opposite to the clutch gear 32 and the clutch holder 35, i.e., on one face (an upper face) side of the clutch gear 32 and one face (a bottom face) side of the clutch holder 40. When the clutch protrusive portion 40 and the clutch recessed portion 41 are established in an engaged state, the clutch gear 32 and the clutch holder 35 are in a continuous state (a non-disengaged state or a connected state); or when the clutch protrusive portion 40 and the clutch recessed portion 41 are in a disengaged state, the clutch gear 32 and the clutch holder 35 are in a discontinuous state (an engaged state or a disconnected state). The clutch mechanism 15 is disallowed to disengage with an electrically driven rotation force of the motor 13 and the rotation force transmission mechanism (the deceleration mechanism 14 and the clutch mechanism 15) and disengages with a force which is equal to or greater than the electrically driven rotation force so as to be able to rotate the mirror assembly 4 relative to the shaft 10.

Among the clutch members, the other face (a bottom face) side of the clutch gear 32 abuts against one face (a top face) of a bottom part of the gear case 11 directly or via a washer (not shown). On the other hand, among the clutch members, the other face (a top face) side of the clutch holder 35 directly abuts against the spring 36.

The clutch gear 32, as shown in FIG. 6 to FIG. 10, is formed of: a clutch member 25 having the clutch protrusive portion 40; and a gear member 33 having a gear portion 28. The clutch gear 32 is adapted to fixedly mount the clutch member 25 and the gear member 33 in a rotational direction.

The clutch member 25 is formed of a resin member with its low friction and high sliding properties, for example, POM (polyacetal or acetal resin). The gear member 33 is formed of a metal member having its rigidity or durability, for example, SWCH (carbon steel for cold forging), a sintered metal, a resin member with its high rigidity (for example, glass fiber-containing nylon, PPS (polyphenylene sulfide, or polyphenylene sulfide)). On the other hand, the clutch holder 35 is formed of a resin member with its low friction and high sliding properties, for example, nylon.

The gear member 33 is formed in a cylindrical shape. The gear portion 28 is provided on an outer circumferential face of the gear member 33. The clutch member 25 is formed in a cylindrical shape. The clutch protrusive portion 40 is integrally provided on one end face (upper end face) of the clutch member 25. A dimensional relationship between an outer diameter of the clutch member 25 and an inner diameter of the gear member 33 lies in a dimensional relationship enabling the clutch member 25 to be inserted into the gear member 33.

At the clutch member 25 and the gear member 33, a rotation stop portion configured to prevent mutual rotation around a rotational center O-O of the shaft 10 and a movement stop portion configured to prevent mutual movement in a direction of the rotational center O-O of the shaft 10 are respectively provided. In other words, at a site ranging from one end part (lower end part) to a middle part, of an inner circumferential face of the gear member 33, a plurality of, in this example, three first engagement protrusive portions 34 and second engagement protrusive portions 38, are integrally provided at equal intervals.

At a site ranging from the other end part (lower end part) to the middle part, of an outer circumferential face of the clutch member 25, a plurality of, in this example, three first engagement recessed portions 42 and second engagement recessed portions 43 are provided at equal intervals. The first engagement recessed portions 42 and the second engagement recessed portions 43 and the clutch protrusive portion 40, are provided in correspondence with both end parts of the clutch member 25.

A dimensional relationship between the first engagement recessed portions 42 and the second engagement recessed portions 43 and the first engagement protrusive portions 34 and the second engagement protrusive portions 38 lies in a dimensional relationship in which the first engagement recessed portions 42 and the second engagement recessed portions 43, of the clutch member 25 that is made of a resin member, are respectively brought into an elastic engagement (elastic abutment or elastic intimate contact) with the engagement protrusive portions 34 and the second engagement protrusive portions 38, of the gear member 33 that is made of a metal member, by means of elastic action. The first engagement recessed portions 42 and the second engagement recessed portions 43 and the first engagement protrusive portions 34 and the second engagement protrusive portions 38 are formed in a lance shape or in a tapered shape, although the shape is not limitative thereto in particular.

At the other end part of the outer circumferential face of the clutch member 25 and at sites among the three first engagement recessed portions 42, a plurality of, in this example, three elastic jaw portions 44 are integrally provided at equal intervals. At a site ranging from the other end part to the middle part, of the clutch member 25, and between each of the first engagement recessed portions 42 and each of the elastic jaw portions 44, a slit 45 is provided. The slit 45 is adapted to enable the elastic jaw portion 44 to easily slacken in a radial direction of the clutch member 25 at the time of slackening.

The first engagement protrusive portions 34 and the second engagement protrusive portions 38, the first engagement recessed portions 42 and the second engagement recessed portions 43, and the elastic jaw portions 44 form the rotation stop portion and the movement stop portion. The clutch member 25 is inserted into the gear member 33 so as to disable rotation around the rotational center O-O of the shaft 10 by means of the rotation stop portion (the first engagement protrusive portions 34 and the second engagement protrusive portions 38 and the first engagement recessed portions 42 and the second engagement recessed portions 43) and so as to disable movement in the direction of the rotational centerline O-O of the shaft 10 by means of the movement stop portion (the first engagement protrusive portion 34 and the second engagement protrusive portion 38 and the first engagement recessed portions 42 and the second engagement recessed portions 43 and the elastic jaw portions 44). As a result, the clutch member 25 and the gear member 33 are integrally mounted.

Figure 8:
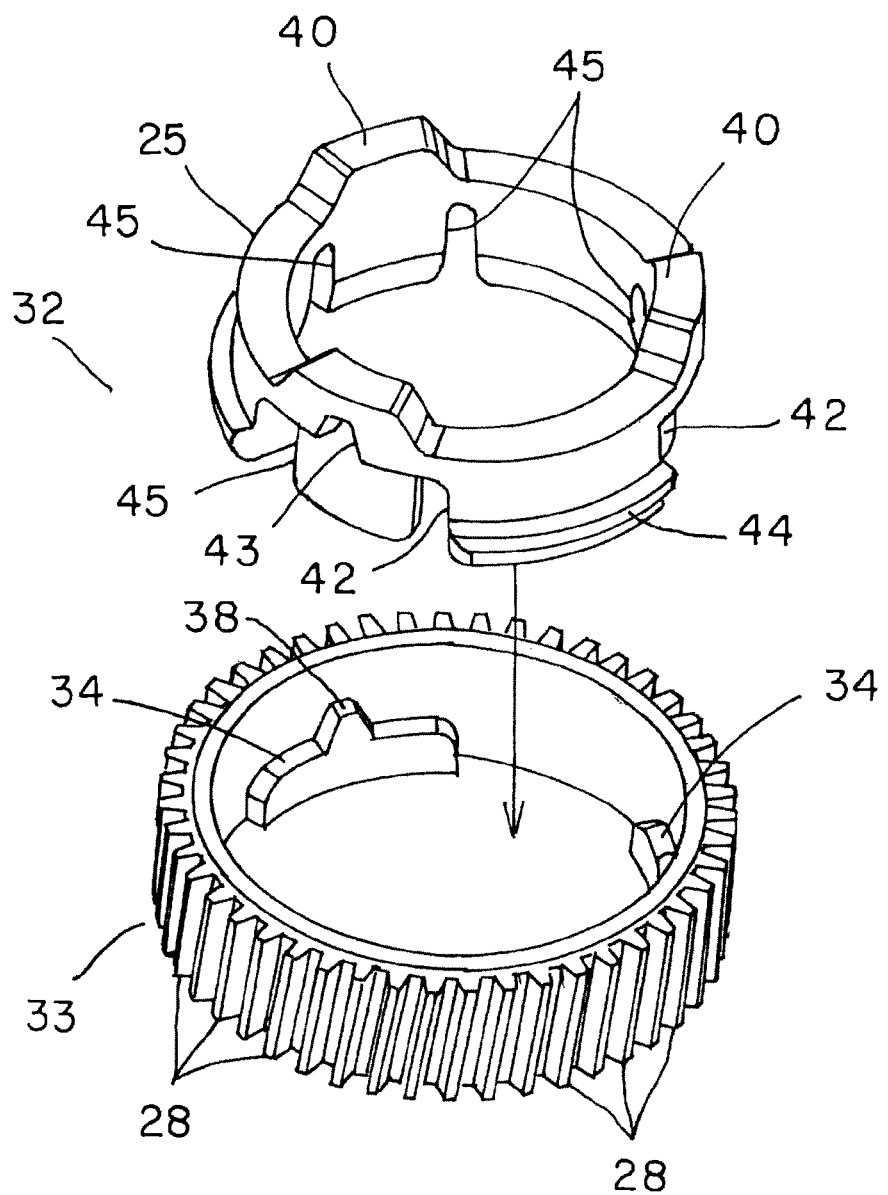
FIG. 8 is an exploded perspective view showing a clutch member and a gear member, of a clutch gear, similarly.
Figure 9:
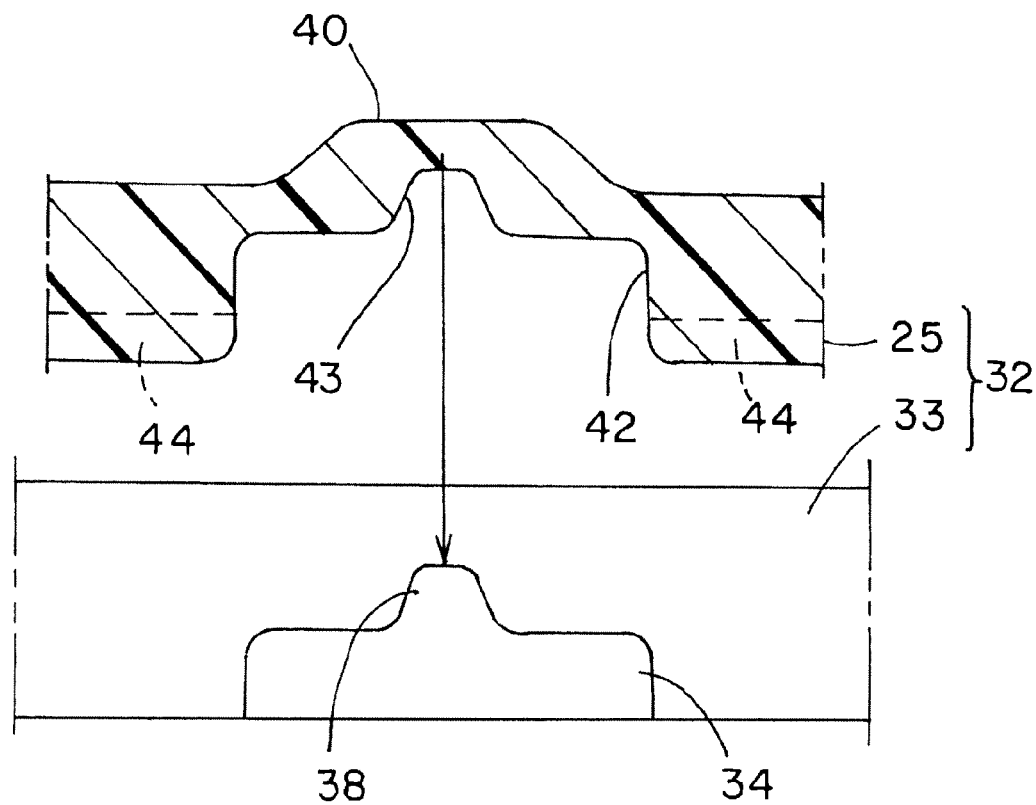
FIG. 9 is an exploded partial sectional view showing a clutch member and a gear member, of a clutch gear, similarly.

In other words, as shown in FIG. 8 and FIG. 9, the first engagement recessed portions 42 and the second engagement recessed portions 43, of the clutch member 25, are aligned with the first engagement protrusive portions 34 and the second engagement protrusive portions 38, of the gear member 33. Next, as indicated by the solid line in FIG. 8 and FIG. 9, the other end part of the clutch member 25 is inserted into the gear member 33 through the other end part (upper end part) of the gear member 33. The elastic jaw portions 44 of the clutch member 25 then slacken inward in the radial direction of the clutch member 25.

Figure 6:
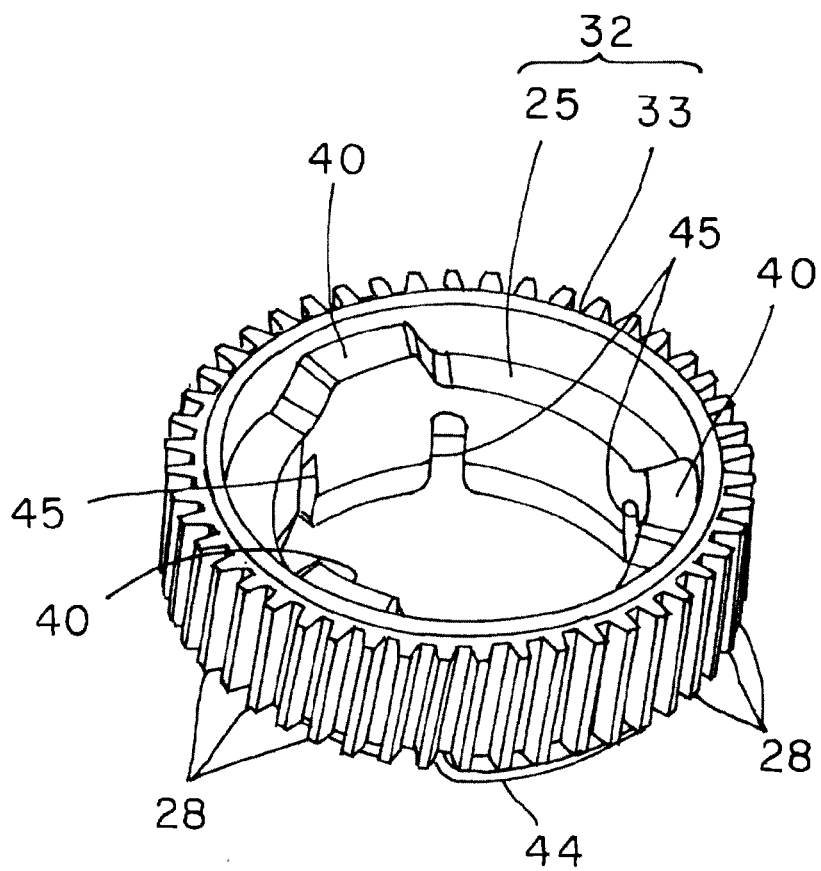
FIG. 6 is a perspective view showing a clutch gear, similarly.
Figure 7:
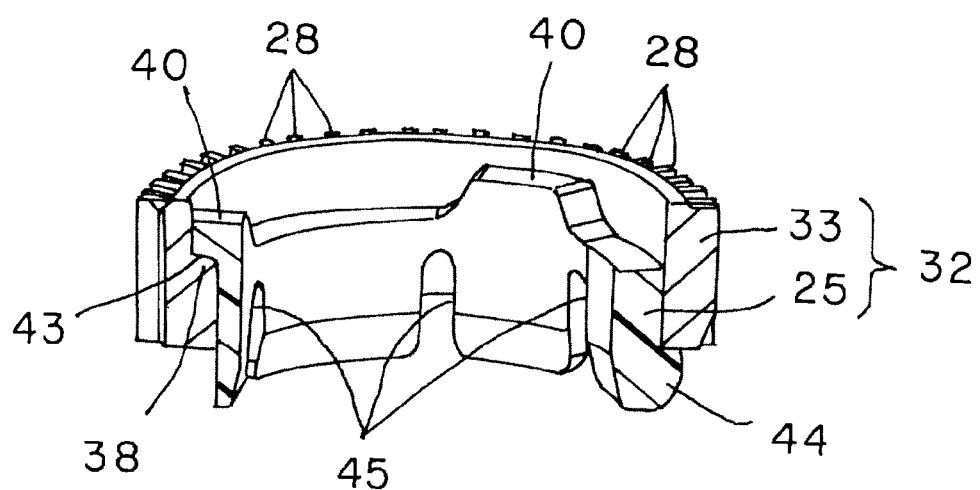
FIG. 7 is a perspective view showing a state in which a clutch member and a gear member are assembled with each other, although a clutch gear is not partially shown, similarly.
Figure 10:
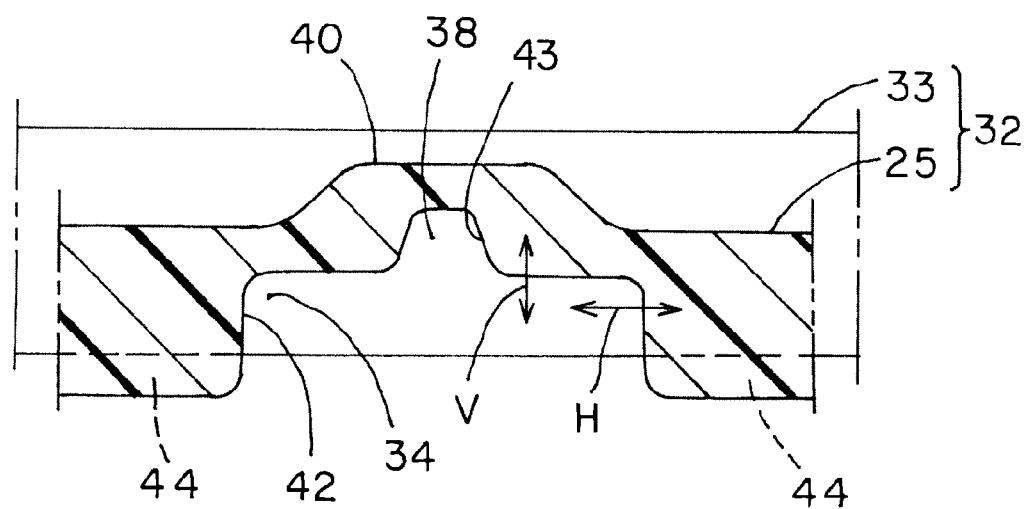
FIG. 10 is a partial sectional view showing a state in which a clutch member and a gear member, of a clutch gear, are assembled with each other, similarly.

The elastic jaw portions 44 of the clutch member 25 reach one end part of the gear member 33. Then, as shown in FIG. 6, FIG. 7, and FIG. 10, the elastic jaw portions 44 of the clutch member 25, which have slackened inward in the radial direction of the clutch member 25, are elastically returned to the outside in the radial direction of the clutch member 25 and then come into elastic engagement (elastic abutment or elastic intimate contact) with one end part of the gear member 33. At the same time, the first engagement recessed portions 42 and the second engagement recessed portions 43, of the clutch member 25, respectively elastically engage with the first engagement protrusive portions 34 and the second engagement protrusive portions 38, of the gear member 33.

As a result, each side face of the first engagement recessed portion 42 abuts against each side face of the first engagement protrusive portion 34, and each of the second engagement recessed portion 43 abuts against each of the second engagement protrusive portion 38, whereby the clutch member 25 is inserted into the gear member 33 so as to disable rotation around the rotational center O-O of the shaft 10 (in the direction indicated by the solid arrow H in FIG. 10). In addition, a bottom face of the first engagement recessed portion 42 abuts against a top face of the first engagement protrusive portion 34, a bottom face of the second engagement recessed portion 43 abuts against a top face of the second engagement protrusive portion 38, and a top face of the elastic jaw portion 44 abuts against a bottom face of the gear member 33, whereby the clutch member 25 is inserted into the gear member 33 so as to disable movement in the direction of the rotational centerline O-O of the shaft 10 (in the direction indicated by the solid arrow V in FIG. 10). In this manner, the clutch member 25 and the gear member 33 are integrally mounted.

The interposing member 6 is provided between the shaft holder 9 and the gear case 11. The interposing member 6 is comprised of an inexpensive member with its low friction and frictional wear proof property, for example, a POM (polyacetal or an acetal resin) or a PPS (polyphenylene sulfide). The interposing member 6 is formed in a hollow-shaped cylindrical shape having a through hole (not shown) through which the shaft 10 is to be inserted and having a jaw portion 23 at one end part (a lower end part). The interposing member 6 is mounted on the shaft 10 so as to be rotatable around the rotational center O-O of the shaft 10. As shown in FIG. 6 and FIG. 8, on one face (a bottom face) of the jaw portion 23 of the interposing member 6, two arc-shaped protrusive portions (not shown) around the rotational center O-O of the shaft 10 are integrally provided at equal intervals. Abutment faces (not shown) of the electrically driven rotation range restricting mechanism are provided on both end faces of the arc-shaped protrusive portion, respectively. In addition, on the other face (a top face) of the jaw portion 23 of the interposing member 6, a plurality of trapezoidal engagement protrusive portions (not shown) which serve as engagement portions of the buffering mechanism, two pieces in this example, are integrally provided at equal intervals on a circumference around the rotational center O-O of the shaft 10.

The shaft holder 9 and the shaft 10 are comprised of a member with its high rigidity, for example, a die cast or a resin. As shown in FIG. 7 and FIG. 8, on a top face of the shaft holder 9, two arc-shaped protrusive portions (not shown) around the rotational center O-O of the shaft 10 are integrally provided at equal intervals in correspondence with the arc-shaped protrusive portion (not shown) of the interposing member 6. On both end faces of the arc-shaped protrusive portion, the abutment faces of the electrically driven rotation range restricting mechanism are provided in correspondence with the abutment faces (not shown) of the interposing member 6, respectively.

The gear case 11 is comprised of a member with its high rigidity, for example, a resin containing nylon or a glass fiber or a carbon fiber. On the other face (a bottom face) of a bottom part of the gear case 11, a plurality of trapezoidal engagement recessed portions (not shown) which serve as engagement portions of the buffering mechanism, two pieces in this example, are integrally provided at equal intervals in correspondence with the engagement protrusive portions of the interposing member 6 on a circumference around the rotational center O-O of the shaft 10.

The electrically driven rotation range restricting mechanism is a mechanism for restricting a range of the electrically driven rotation of a mirror assembly. In other words, the electrically driven rotation range restricting mechanism is comprised of the abutment faces which are provided at the interposing member 6 and the shaft holder 9, and is a mechanism in which the abutment face of the interposing member 6 and the abutment face of the shaft holder 9 abut against each other, whereby the interposing member 6 is fixed to the shaft holder 9 and then the electrically driven rotation range of the mirror assembly 4 is restricted. The electrically driven rotation range, as shown in FIG. 1, is a range between a use location A and a storage location B. As a result, when one abutment face of the interposing member 6 and one abutment face of the shaft holder 9 abut against each other, the mirror assembly 4 is positioned in the use location A. Alternatively, when the other abutment face of the interposing member 6 and the other abutment face of the shaft holder 9 abut against each other, the mirror assembly 4 is positioned in the storage location B.

The buffering mechanism is a mechanism for rotating the mirror assembly 4 for the sake of buffering. In other words, the buffering mechanism is comprised of an engagement protrusive portion and an engagement recessed portion which are provided at the interposing member 6 and the gear case 11. This buffering mechanism is a mechanism in which, when the engagement protrusive portion of the interposing member 6 and the engagement recessed portion of the gear case 11 are disallowed to disengage from each other with the electrically driven rotation force, the interposing member 6 and the gear case 11 rotate together around the rotational center O-O of the shaft 10 relative to the shaft 10 and the shaft holder 9 in the electrically driven rotation range (a range between a use location A and a storage position B) and a force which is equal to or greater than the electrically driven rotation force has been applied in a forward F direction of a vehicle, the engagement protrusive portion of the interposing member 6 and the engagement recessed portion of the gear case 11 disengage from each other, and further, the clutch mechanism 15 is disengaged (a clutch protrusive portion 40 of the clutch gear 32 and a clutch recessed portion 41 of the clutch holder 35 are disengaged from each other), and the gear case 11 rotates in the counterclockwise direction seen from the top, around the rotational center O-O of the shaft 10 relative to the shaft 10 and the shaft holder 9.

(Description of Function)

The electrically driven storage type door mirror device 1 in this exemplary embodiment is made of the constituent elements as described above. Hereinafter, functions of the device will be described.

Figure 11:
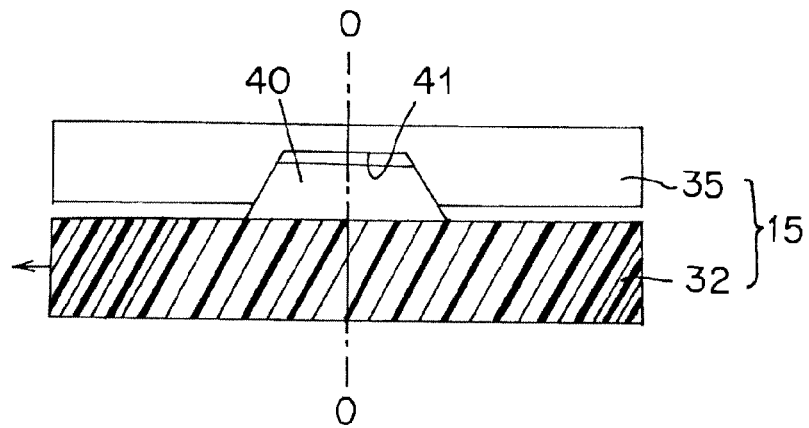
FIG. 11 is an explanatory view showing a state of connection between a clutch gear and a clutch holder, similarly.
Figure 14:
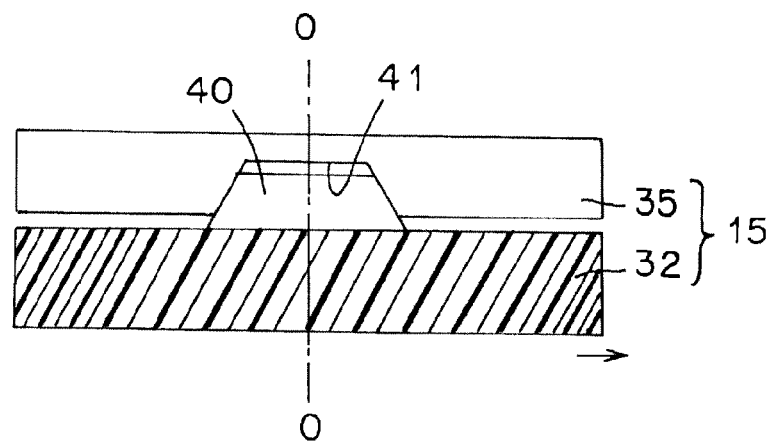
FIG. 14 is an explanatory view showing a state of connection between a clutch gear and a clutch holder, similarly.
Figure 15:
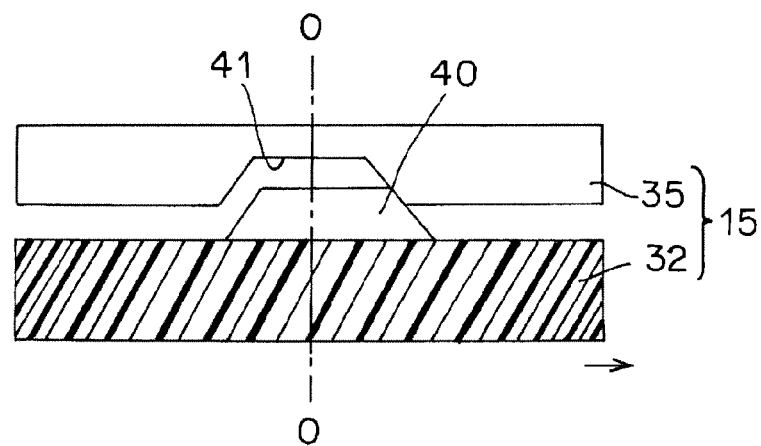
FIG. 15 is an explanatory view showing a state of connection between a clutch gear and a clutch holder when an external force is applied from a rear side to a mirror assembly, similarly.

First, a description will be given with respect to a case in which a mirror assembly 4 that is positioned in a use location A is electrically driven to be rotated and stored in a storage location B, as shown in FIG. 1. When the mirror assembly 4 is established in a state in which it is positioned in the use location A (in a set state or in a use state), the clutch mechanism 15, as shown in FIG. 11, FIG. 14, is established in a state in which a clutch protrusive portion 40 of a clutch gear 32 and a clutch recessed portion 41 of a clutch holder 35 are in an engaged state, so that the clutch gear 32 and the clutch holder 35 are in continuous state. Therefore, the clutch gear 32 is a state in which rotation is disabled relative to a shaft 10, together with the clutch holder 35.

In this set state (a use state), a switch (not shown) in an automobile room is operated and then power is fed to a motor 13 via a connector 8, a socket portion 7, and a board 27 so as to thereby drive the motor 13. Then, a rotation force of the motor 13 is transmitted to the clutch gear 32 that is fixed to the shaft 10 via an output shaft and a deceleration mechanism 14. At this time, the clutch gear 32 is established in a state in which rotation is disabled relative to the shaft 10, together with the clutch holder 35, so that a second worm gear 31 of the deceleration mechanism 14 rotates around a rotational center O-O of the shaft 10 with the clutch gear 32 serving as a fixing gear. By means of this rotation, the mirror assembly 4 having the electrically driven storage unit 3 incorporated therein, as shown in FIG. 1, rotates in the clockwise direction from a use location A to a storage location B around the rotational center O-O of the shaft 10.

When the mirror assembly 4 is positioned in the storage location B, a value of a current (an actuation current) which is supplied to the motor 13 rises and reaches a predetermined value; a switch circuit of the board 27 is actuated; and then, current supply to the motor 13 is interrupted. As a result, the mirror assembly 4 stops and is positioned in the storage location B that serves as a predetermined location shown in FIG. 1.

Next, a description will be given with respect to a case in which the mirror assembly 4 that is positioned in the storage location B is electrically driven to rotate and is returned to the use location A, as shown in FIG. 1. When the mirror assembly 4 is established in a state in which it is positioned in the storage location B (in a storage state), the clutch mechanism 15 is established in a connected state, as in its set state, so that the clutch gear 32 is established in a state in which rotation is disabled relative to the shaft 10, together with the clutch holder 35.

In this storage state, a switch (not shown) in an automobile room is operated to drive the motor 13. Then, a rotation force of the motor 13 is transmitted to the clutch gear 32 that is established in a state in which rotation is disabled via the deceleration mechanism 14. In this manner, the mirror assembly 4 having the electrically driven storage unit 3 incorporated therein, as shown in FIG. 1, rotates in the counterclockwise direction from the storage location B to the use location A around the rotational center O-O of the shaft 10.

When the mirror assembly 4 is positioned in the use location A, a value of a current (an actuation current) which is supplied to the motor 13 rises and reaches a predetermined value; a switch circuit of the board 27 is actuated; and then current supply to the motor 13 is interrupted. As a result, the mirror assembly 4 stops and is positioned in the use location A that serves as a predetermined location shown in FIG. 1.

Further, a description will be given with respect to a case in which the mirror assembly 4 that is positioned in the use location A is caused to tilt in a storage location B for the sake of buffering, as shown in FIG. 1. When the mirror assembly 4 is a state in which it is positioned in the use location A (in a set state or in a use state), the clutch mechanism 15 is established in a connected state, so that the clutch gear 32 is established in a state in which rotation is disabled relative to the shaft 10, together with the clutch holder 35.

In this set state (a use state), a force in the clockwise direction, the force (in the direction indicated by the solid arrow F1 in FIG. 4) being equal to or greater than an electrically driven rotation force exerted by the motor 13 and the deceleration mechanism 14 (a manual force and a force when something abuts against the mirror assembly 4), is applied to the mirror assembly 4 that is positioned in the use location A. Then, the gear case 11 that is mounted on the mirror assembly 4 is about to rotate in the clockwise direction (in the direction indicated by the solid arrow F2 in FIG. 4). At this time, the interposing member 6 is not fixed to the shaft 10 and the shaft holder 9, so that the interposing member 6 can rotate in the clockwise direction around the rotational center O-O of the shaft 10, to the shaft 10 and the shaft holder 9.

Figure 12:
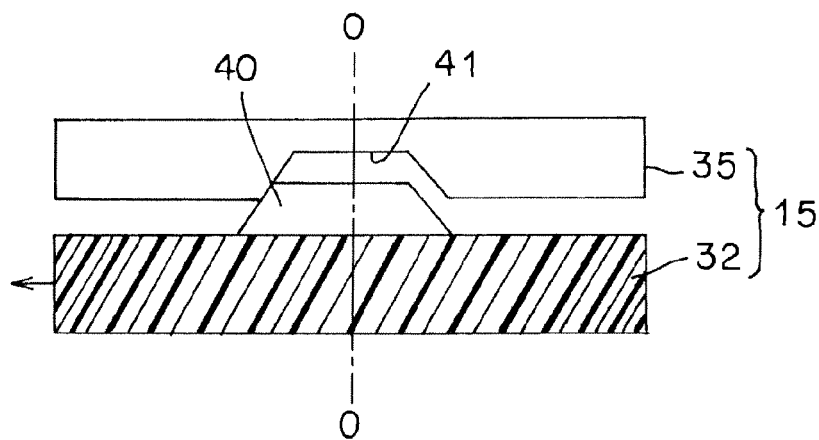
FIG. 12 is an explanatory view showing a state of connection between a clutch gear and a clutch holder when an external force is applied from a front side to a mirror assembly, similarly.
Figure 13:
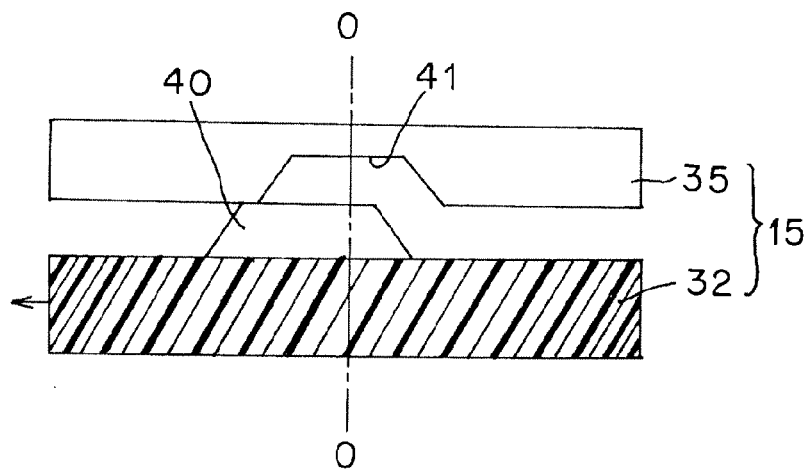
FIG. 13 is an explanatory view showing a state of disconnection between a clutch gear and a clutch holder, similarly.

Alternatively, the clutch holder 35 is engaged with the shaft 10 so as to disable rotation, and therefore, the clutch protrusive portion 40 of the clutch gear 32 at the side of the gear case 11 rolls on the clutch holder recessed portion 41 of the clutch holder 35 at the side at which the shaft 10 is fixed (refer to FIG. 12) and then the clutch protrusive portion 40 of the clutch gear 32 and the clutch holder recessed portion 41 of the clutch holder 35 disengage from each other (refer to FIG. 13). At this time, the clutch holder 35 moves (rises) against a resilience force of a spring 36.

As a result, the gear case 11 (including the cover 12, the motor 13, the deceleration mechanism 14, the bearing member 16, and the clutch gear 32) rotates in the clockwise direction. In this manner, as shown in FIG. 1, the mirror assembly 4 rotates in the clockwise direction from the use location A to the storage location B and then is positioned in the storage location B at a time point when one stopper face 22 of a stopper protrusive portion 21 of the shaft holder 9 has abutted against one stopper face of a guide groove of the gear case 11.

Then, as shown in FIG. 1, the mirror assembly 4 that is positioned in the storage location B is caused to rotate in the counterclockwise direction with a force which is greater than an electrically driven rotation force. Subsequently, the gear case 11 that is mounted to the mirror assembly 4 (including the cover 12, the motor 13, the deceleration mechanism 14, the bearing member 16, and the clutch gear 32) rotates in the clockwise direction, so that as shown in FIG. 1, the mirror assembly 4 rotates in the counterclockwise direction from the storage location B to the use location A. The clutch protrusive portion 40 of the clutch gear 32 and the clutch holder recessed portion 41 of the clutch holder 35 then engage with each other and then the clutch mechanism 15 is established in its collected state.

Further, a description will be given with respect to a case in which the mirror assembly 4 that is positioned in the use location A is caused to tilt in the forward tilting location C, as shown in FIG. 1. When the mirror assembly 4 is established in a state in which it is positioned in the use location A (in a set state or use state), the clutch mechanism 15 is established in a connected state, so that the clutch gear 32 is established in a state in which rotation is disabled relative to the shaft 10, together with the clutch holder 35.

In this set state (use state), a force in the counterclockwise direction, which is greater than an electrically driven rotation force exerted by the motor 13 and the deceleration mechanism 14, (a manual force or a force exerted when something hits against the mirror assembly 4), is applied to the mirror assembly 4 positioned in a use location A. The gear case 11 that is mounted on the mirror assembly 4 is then about to rotate in the counterclockwise direction. At this time, the interposing member 6 is fixed to the shaft holder 9 to disable rotation in the counterclockwise direction.

Thus, a gear protrusive portion of the interposing member 6 and a gear recessed portion of the gear case 11 first disengage from each other. At this time, the gear case 11 (including the cover 12, the motor 13, the deceleration mechanism 14, the bearing member 16, the clutch gear 32, and the clutch holder 35), moves (rises) against the resilience force of the spring 36.

Then, the gear case 11 is further about to rotate in the counterclockwise direction (the direction indicated by the solid arrow in FIG. 12 and FIG. 14). A backlash between the clutch gear 32 and the second worm gear 31 is then clogged, a gap in a thrust direction of the second worm gear 31 is clogged, and an engagement gap between the shaft 10 and the clutch holder 35 is clogged.

Figure 16:
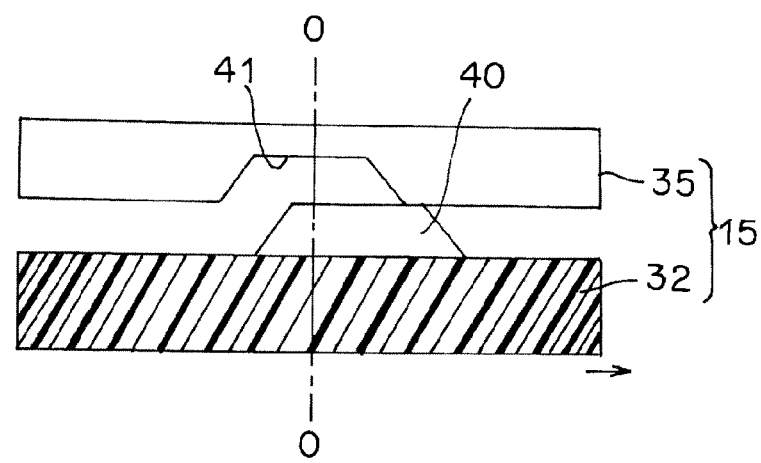
FIG. 16 is an explanatory view showing a state of disconnection between a clutch gear and a clutch holder, similarly.

The clutch holder 35 is engaged with the shaft 10 to disable rotation, and therefore, the clutch protrusive portion 40 of the clutch gear 32 at the side of the gear case 11 rolls on the clutch holder recessed portion 41 of the gear holder 35 at the side at which the shaft 10 is fixed (refer to FIG. 15) and then the clutch protrusive portion 40 of the clutch gear 32 and the clutch holder recessed portion 41 of the clutch holder 35 disengage with each other (refer to FIG. 16). At this time, the clutch holder 35 moves (rises) against the resilience force of the spring 36.

As a result, the gear case 11 (including the cover 12, the motor 13, the deceleration mechanism 14, the bearing member 16, and the clutch gear 32) rotates in the counterclockwise direction. In this manner, as shown in FIG. 1, the mirror assembly 4 rotates in the counterclockwise direction from the use location A to a forward tilt location C and then is positioned in the forward tilt location at a time point at which one stopper face 22 of the stopper protrusive portion 21 of the shaft holder 9 abuts against one stopper face of a guide groove of the gear case 11.

Then, as shown in FIG. 1, the mirror assembly 4 that is positioned in the forward tilting location C is caused to rotate in the clockwise direction with a force which is greater than an electrically driven rotation force. Subsequently, the gear case 11 that is mounted on the mirror assembly 4 (including the cover 12, the motor 13, the deceleration mechanism 14, the bearing member 16, and the clutch gear 32) rotates in the clockwise direction, so that as shown in FIG. 1, the mirror assembly 4 rotates in the clockwise direction from the forward tilting location C to the use location A.

Afterwards, the clutch protrusive portion 40 of the clutch gear 32 and the clutch recessed portion 41 of the clutch holder 35 first engage with each other and then the clutch mechanism 15 is established in a connected state. After that, the gear protrusive portion of the interposing member 6 and the gear recessed portion of the gear case 11 are geared with each other and then the interposing member 6 and the gear case 11 are integrated with each other. As a result, as shown in FIG. 1, the mirror assembly 4 is positioned in the use location A.

DESCRIPTION OF ADVANTAGEOUS EFFECT(S)

An electrically driven storage type door mirror device 1 in the exemplary embodiment is made of the constituent elements and functions as described above. Hereinafter, the advantageous effects of the device will be described.

According to the electrically driven storage type door mirror device 1 in the exemplary embodiment, a clutch member 25 having a clutch protrusive portion 40 and a gear member 33 having a gear portion 28 are manufactured respectively separately, and the clutch member 25 and the gear member 33 are fixedly mounted in a rotational direction to thereby form a clutch gear 32 of a clutch mechanism 15 and to thereby ensure that the clutch member 25 that is manufactured separately from the gear member 33 of the clutch gear 32 is formed of a resin member. As a result, the electrically driven storage type door mirror device 1 in the exemplary embodiment is capable of eliminating or reducing dispersion in clutch torque of the clutch mechanism 15 for each product to its required minimum in comparison with a clutch gear in which a clutch portion and a gear portion are integrally formed and which is formed of a metal member or a resin member with its high rigidity. In other words, in the case of a clutch gear made of a metal member, in order to stabilize a clutch torque, there is a need to apply a treatment if eliminating surface roughness such as barrel grinding, or alternatively, in order to improve frictional properties, there is a need to apply a surface hardening treatment such as a heat treatment. Due to dispersion in these treatments, dispersion occurs in surface roughness or surface hardening of the clutch portion, leading to dispersion in clutch torque. In contrast, according to the electrically driven storage type vehicle outside mirror device 1 in the exemplary embodiment, the gear member 33 of the clutch gear 32 and the clutch member 25 that is manufactured separately are formed of a resin member, and therefore, there is no need to apply a treatment of eliminating surface roughness in the clutch gear 32 or a surface hardening treatment. As a result, no dispersion occurs in surface roughness or surface hardening of the clutch protrusive portion 40 of the clutch member 25 that is made of the resin member, making it possible to eliminate or reduce the dispersion in clutch torque to its required minimum.

Moreover, according to the electrically driven storage type vehicle outside mirror device 1 in the exemplary embodiment, there is no need to apply a treatment of eliminating surface roughness or a surface hardening treatment in the clutch member 25 of the clutch gear 32, and therefore, manufacturing costs can be reduced accordingly.

In addition, according to the electrically driven storage type vehicle outside mirror device 1 in the exemplary embodiment, the gear member 33 that is manufactured separately from the clutch member 25 of the clutch gear 32 is formed of a metal member or a resin member with its high rigidity, and therefore, even if the clutch member 25 that is manufactured separately from the gear member 33 is made of the resin member, the rigidity or durability of a gear portion 28 of the clutch gear 32 can be ensured in the same manner as that in the clutch gear made of the metal member or the resin member with its high rigidity.

Further, according to the electrically driven storage type vehicle outside mirror device 1 in the exemplary embodiment, the clutch holder 35 is formed of a resin member, and therefore, a stable clutch torque can be ensured over a long period of time from an initial stage of manufacture by using a combination of: the clutch holder recessed portion 41 of the clutch holder 35 that is made of the resin member; and the clutch protrusive portion 40 of the clutch member 25 that is made of a same resin member, of the clutch gear 32, in other words, by using a combination of the clutch protrusive portion 40 and the clutch holder recessed portion 41 that are made of a resin member with its low friction and high sliding properties.

Moreover, the electrically driven storage type door mirror device 1 in the exemplary embodiment is capable of reducing dependency on grease in comparison with a combination of clutch portions of a metal member by using a combination between the clutch protrusive portion 40 and the clutch holder recessed portion 41, of a resin member with its low friction and high sliding properties, and therefore, an increase in clutch torque exerted by reduction of grease can be restrained and then a stable clutch torque can be obtained accordingly.

Furthermore, according to the electrically driven storage type door mirror device 1 in the exemplary embodiment, the clutch member 25 and the gear member 33 that are manufactured separately are integrally mounted to disable rotation around a rotational center O-O of a shaft 10 by means of a rotation stop portion (first engagement protrusion portions 34 and second engagement protrusive portions 38 and first engagement recessed portions 42 and second engagement recessed portions 43) and to disable movement in the direction of the rotational centerline O-O of the shaft 10 by means of a movement stop portion (first engagement portions 34 and second engagement protrusive portions 38, first engagement recessed portions 42 and second engagement recessed portions 43, and elastic jaw portion 44). As a result, according to the electrically driven storage type door mirror device 1 in the exemplary embodiment, even if the clutch gear 32 is formed of the clutch member 25 and the gear member 33 that are manufactured separately, the clutch portion and the gear portion is capable of acting as a clutch in the same manner as that of a clutch gear in which a clutch portion and a gear portion are integrated with each other.

DESCRIPTION OF EXAMPLES OTHER THAN EXEMPLARY EMBODIMENT

In the foregoing exemplary embodiment, an electrically driven storage type door mirror device has been described. However, the present invention can also be applied to a vehicle outside mirror device other than the electrically driven storage type door mirror. For example, the present invention can be applied to a vehicle outside mirror device of electrically driven storage type such as a vehicle fender mirror device of electrically driven storage type.

In addition, in the foregoing exemplary embodiment, a clutch protrusive portion 40 is provided at a clutch gear 32 and a clutch recessed portion 41 is provided at a clutch holder 35. However, in the present invention, a clutch recessed portion may be provided at a clutch gear and a clutch protrusive portion may be provided at a clutch holder, or alternatively, a clutch protrusive portion and a clutch recessed portion may be provided at a clutch gear and a clutch recessed portion and a clutch protrusive portion may be provided at a clutch holder.

What is claimed is:

1. A vehicle outside mirror device of which a mirror assembly is rotatably mounted on a vehicle body via an electrically driven storage unit and a base,
   the electrically driven storage unit comprising:
   a shaft holder that is fixed to the base;
   a shaft that is provided on the shaft holder;
   a casing which is rotatably mounted on the shaft, and on which the mirror assembly is mounted;
   a motor and a rotation force transmission mechanism which are housed in the casing, for electrically driving the mirror assembly to rotate relative to the shaft; and
   a clutch mechanism which is provided in the rotation force transmission mechanism, which is unable to be disengaged with an electrically driven rotation force of the motor and the rotation force transmission mechanism, and is able to be disengaged with a force that is equal to or greater than the electrically driven rotation force to thereby enable the mirror assembly to rotate relative to the shaft,
   the clutch mechanism comprising:
   a clutch gear having a first clutch portion;
   a clutch holder having a second clutch portion; and
   a spring configured to connect the first and second clutch portions to each other so as to enable disconnection from each other,
   wherein the clutch gear is made of a clutch member having the first clutch portion provided on one end face thereof and a gear member having a gear portion,
   the gear member is formed in a cylindrical shape, the gear portion being provided on an outer circumferential face of the gear member,
   the gear member is formed of a metal member and the clutch member is formed of a resin member in a cylindrical shape,
   the cylindrical shape of the clutch member has such dimension that the clutch member elastically engages with the gear member through elastic action between the resin member and the metal member, the clutch member being inserted into the gear member such that an outer face of the clutch member is surrounded by the gear member, so that the clutch member and the gear member are fixedly mounted in a rotational direction.

2. The vehicle outside mirror device according to claim 1, wherein the clutch holder is formed of a resin member.

3. The vehicle outside mirror device according to claim 1, wherein
   the clutch member and the gear member have a rotation stop portion configured to prevent mutual rotation around a rotational center of the shaft and a movement stop portion configured to prevent mutual movement in a direction of a rotational centerline of the shaft,
   the clutch member is inserted into the gear member and elastically engaged with the gear member through elastic action between the resin member and the metal member at the rotation stop portion to disable rotation around the rotational center of the shaft by means of the rotation stop portion and to disable movement in the direction of the rotation centerline of the shaft by means of the movement stop portion, and the clutch member and the gear member are integrally mounted.

4. The vehicle outside mirror device according to claim 1, wherein, a dimensional relationship between an outer diameter of the clutch member and an inner diameter of the gear member is a dimensional relationship capable of inserting the clutch member in the gear member.

5. The vehicle outside mirror device according to claim 1, wherein, a plurality of elastic jaw portions are integrally provided at equal intervals on the outer circumferential face of the clutch member, and a slit is provided between the elastic jaw portions, the slit being adapted to enable the elastic jaw portion to easily slacken in a radial direction of the clutch member at a time of slackening.

6. A vehicle outside mirror device of which a mirror assembly is rotatably mounted on a vehicle body via an electrically driven storage unit and a base, the electrically driven storage unit comprising:

a shaft holder that is fixed to the base;

a shaft that is provided on the shaft holder;

a casing which is rotatably mounted on the shaft, and on which the mirror assembly is mounted;

a motor and a rotation force transmission mechanism which are housed in the casing, for electrically driving the mirror assembly to rotate relative to the shaft; and a clutch mechanism which is provided in the rotation force transmission mechanism, which is unable to be disengaged with an electrically driven rotation force of the motor and the rotation force transmission mechanism, and is able to be disengaged with a force that is equal to or greater than the electrically driven rotation force to thereby enable the mirror assembly to rotate relative to the shaft, the clutch mechanism comprising:

a clutch gear having a first clutch portion;

a clutch holder having a second clutch portion; and a spring configured to connect the first and second clutch portions to each other so as to enable disconnection from each other, wherein the clutch gear is made of a clutch member having the first clutch portion provided on one end face thereof and a gear member having a gear portion, the gear member is formed in a cylindrical shape, the gear portion being provided on an outer circumferential face of the gear member, the gear member is formed of a metal member and the clutch member is formed of a resin member in a cylindrical shape, the clutch member and the gear member each have a rotation stop portion configured to prevent mutual rotation around a rotational center of the shaft and a movement stop portion configured to prevent mutual movement in a direction of a rotational centerline of the shaft, the cylindrical shape of the clutch member has such dimension that the clutch member is inserted into the gear member such that an outer face of the clutch member is surrounded by the gear member, the clutch member elastically engages with the gear member through elastic action between the resin member and the metal member, so that the clutch member and the gear member are fixedly mounted in a rotational direction, the rotation stop portions of the clutch member and the gear member elastically engage with each other through elastic action between the resin member and the metal member to disable rotation around the rotational center of the shaft by means of the rotation stop portion and to disable movement in the direction of the rotation centerline of the shaft by means of the movement stop portion, and the clutch member and the gear member are integrally mounted.

\* \* \* \* \*